UNITED STATES PATENT OFFICE.

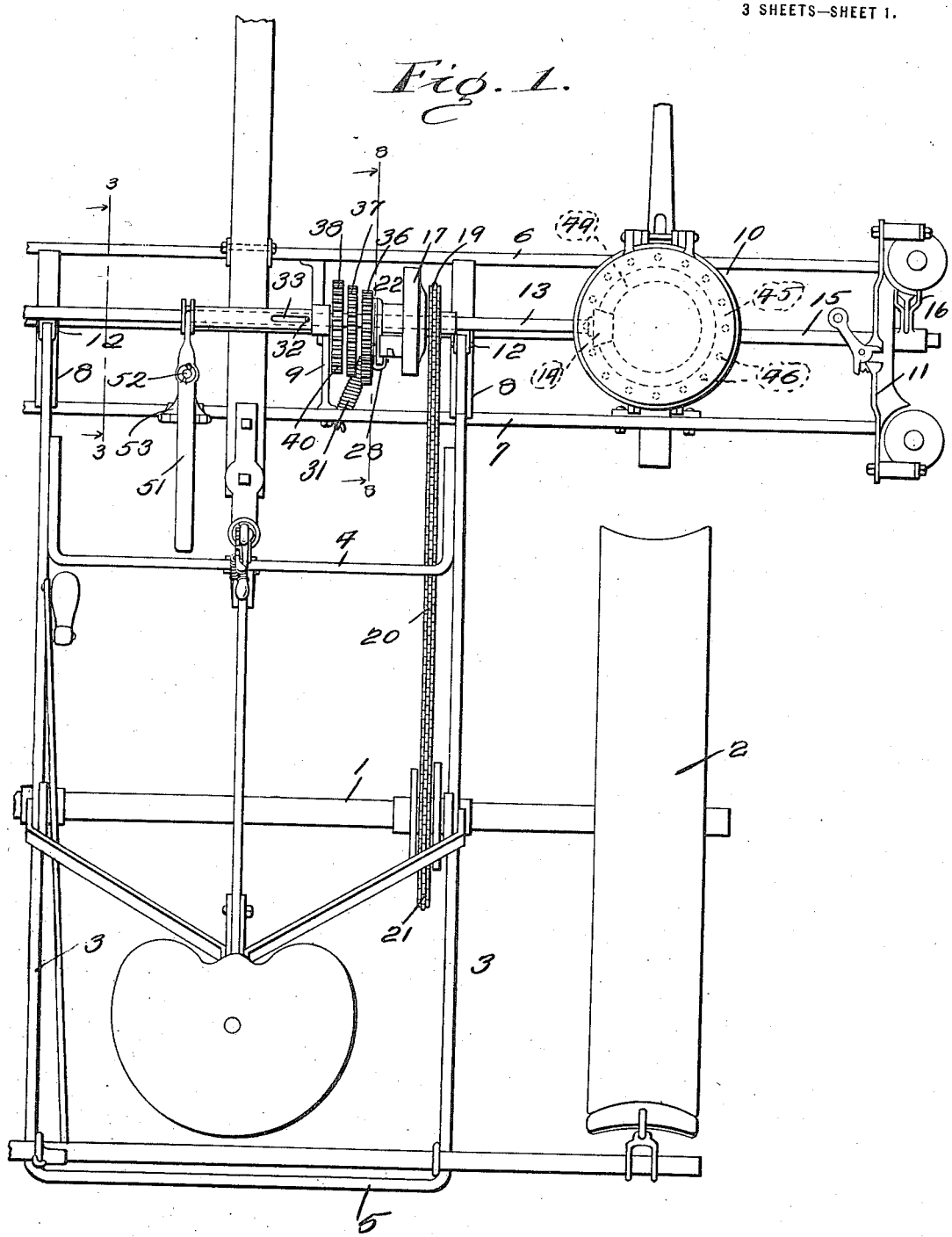

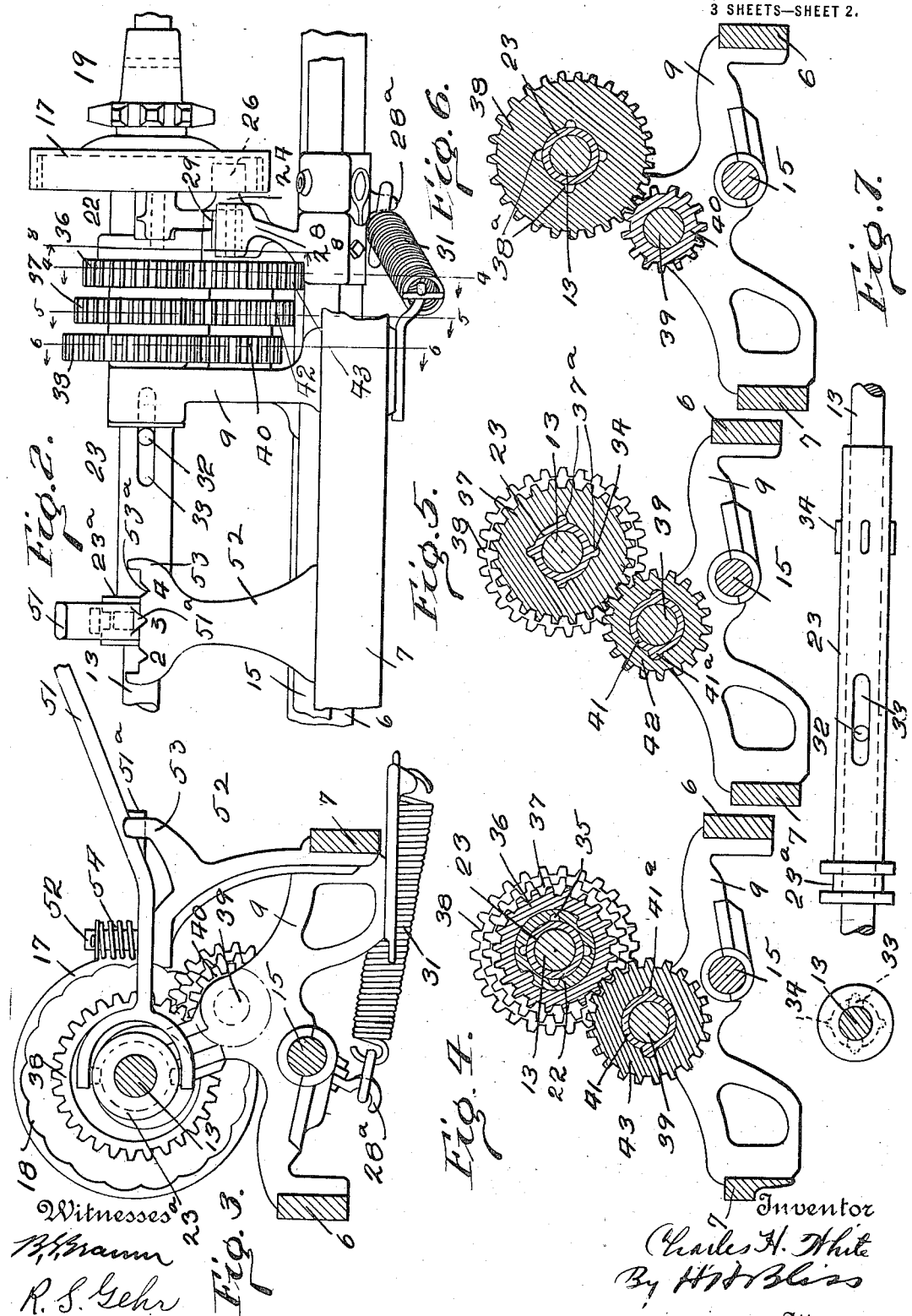

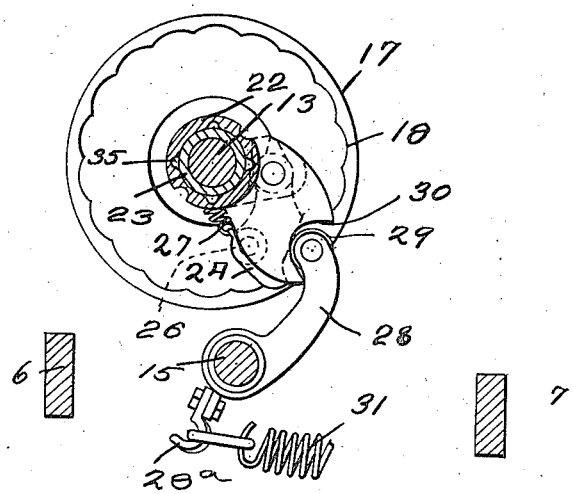
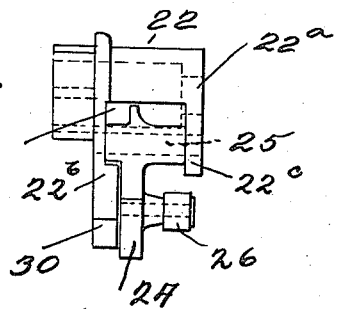

CHARLES H. WHITE, OF MOLINE, ILLINOIS, ASSIGNOR TO DEERE & MANSUR CO., A CORPORATION OF ILLINOIS.

VARIABLE-DROP PLANTER.

1,149,105.

Specification of Letters Patent.

Patented Aug. 3, 1915.

Application filed April 2, 1910. Serial No. 553,089.

*To all whom it may concern:*

Be it known that I, CHARLES H. WHITE, a citizen of the United States, residing at Moline, in the county of Rock Island and State of Illinois, have invented certain new and useful Improvements in Variable - Drop Planters, of which the following is a specification, reference being had therein to the accompanying drawing.

This invention relates to seed planters having mechanism for separating individual seeds from a mass and delivering them one by one to dropping mechanism which, in turn, deposits the seeds in the soil. In check-row planters to which my invention is especially applicable, the seed separating mechanism and seed dropping mechanism are actuated intermittently, being controlled by the tappets on the check-wire.

The object of my present invention is to provide a planter of this character with mechanism by means of which the driver can at will vary the number of seeds delivered by the separating mechanism to the dropping mechanism, thus varying the number of seeds dropped in a hill.

In the accompanying drawings, Figure 1 is a plan view of the planter embodying my improvements, a portion of the machine being broken away to permit illustration on a large scale. Fig. 2 is a detail view showing in rear elevation the clutch and variable speed mechanism. Fig. 3 is a vertical section through the front frame of the planter, taken on the line 3—3 of Fig. 1. Figs. 4, 5, and 6 are vertical sections on the lines 4—4, 5—5, 6—6 of Fig. 2. Fig. 7 is a detail view of the sliding sleeve which constitutes a part of the variable speed gearing. Fig. 8 is a vertical sectional view taken on the line 8—8 of Fig. 2. Fig. 9 is a detail view of the pawl carrier and pawl of the clutch mechanism.

Referring now to the details of construction, 1 is the main driving axle supported by the ground wheels 2. Upon the axle 1 is mounted the main rear frame comprising the side bars 3, 3 and the front and rear cross bars 4, 5. The front ends of the side bars 3, 3 are pivotally connected to the front frame which comprises transverse bars 6, 7, and longitudinally arranged cross bars or braces 8, 8 and 9, which connect the transverse bars 6, 7, the brace 9 also providing bearing supports for the seeder shaft and check fork rock shaft. The transverse bars 6 and 7 are also connected by the seed boot frames upon which seed hoppers 10 are mounted and by the check head frames 11 in the usual manner. The transverse braces 8, 8 carry the pivots 12, 12 to which the front ends of the frame bars 3, 3 are connected.

In the drawings only one hopper and check head appear, but it will be understood that the left end of the front frame is a duplicate of the right end, as is usual in planters of this character which are adapted to plant two rows at a time. On the front frame is mounted a seeder shaft 13, which has a central bearing support carried by the transverse brace 9 and end bearings (not shown) carried by the hopper base castings. At each end the seeder shaft carries a bevel pinion 14 which meshes with and drives a bevel gear which turns the seed plate. Beneath the seeder shaft is mounted a rock shaft 15 which extends laterally beneath the seed hoppers to the check heads. 16 is the check fork, one of which is mounted on each end of the rock shaft 15. The check fork is arranged in the usual way to be engaged by the check wire tappets.

The seeder shaft is driven from the main axle 1 by means of an intermittently operating clutch and a variable speed gearing. 17 is a clutch disk or drum having internal teeth 18. 19 is a sprocket wheel carried by the drum 17, and 20 is a sprocket chain which passes over the wheel 19 and also over a sprocket wheel 21 on the main axle 1. The clutch drum 17 is mounted to turn freely on the seeder shaft and is constantly rotated by the sprocket chain 20. Mounted on the seeder shaft adjacent the clutch drum 17 is a pawl carrier 22. The hub of the pawl carrier 22 is formed to fit over the right end of a sleeve 23 which is slidably mounted upon the seeder shaft, presently to be described in detail. At its right end the pawl carrier 22 is formed with a bearing 22ª which directly engages the seeder shaft and insures a proper support for the pawl carrier when the sleeve 23 is moved endwise. A pawl 24 is mounted on a pivot pin 25, carried between the plate part 22ᵇ and a lug 22ᶜ. 26 is a laterally extending roller adapted to engage the internal teeth 18 of the clutch drum. 27 is a spring which is interposed between the hub of the pawl carrier and the pawl 24 and which tends to press the pawl outward into engagement with the drum teeth 18. Normally, however, the pawl is held out of engagement with the drum teeth by means of the rocker arm 28 mounted on the rock shaft 15, the swinging end of the arm 28 being provided with a roller 29 which engages the pawl and also engages the plate part 22$^b$ of the pawl carrier. This plate part of the carrier is formed with a notch or recess 30 in which the roller 29 lies normally, as shown in Fig. 8. The parts are held normally in these positions by the coiled spring 31 which is connected at one end to a hooked extension 28$^a$ of the rocker arm 28, and at its other end is secured to the bar 7 of the front frame.

When a tappet of the check wire engages the check fork 16 the rock shaft 15 is turned backward and the rocker arm 28 is swung backward and downward against the tension of spring 31. This permits the spring 27 to force the pawl outward, bringing its roller 26 into engagement with the clutch drum, so that the pawl carrier and the drum are operatively connected. Upon the release of the check fork from the wire tappet, the arm 28 is thrown forward again by the spring 31, this occurring before a revolution of the clutch drum and pawl carrier is effected. As the pawl carrier, turning with the drum, approaches its initial position, it engages the roller 29 of rocker arm 28, and the latter is forced backward somewhat and then snaps forward into the recess 30 of the pawl carrier. As the arm is thus snapped forward it strikes the pawl 24 and disengages it from the drum 17. In this manner an intermittent movement of the pawl carrier through a complete revolution is effected, the movement being initiated by the actuation of the check fork. Clutches operating in this manner are well known in the art, but I have combined with this clutch mechanism a change gearing which is interposed between the pawl carrier and the seeder shaft and which serves to convert the unvarying single revolution of the pawl carrier into a variable movement of the seeder shaft, such a movement of said shaft being desirable for the purpose of varying the number of seeds dropped in a hill. The sleeve 23, previously referred to, is slidably mounted on the seeder shaft but is caused to turn with the shaft by means of a pin 32 which fits in a slot 33 of the sleeve. The right end of the sleeve 23 extends into the hub of the pawl carrier and near its right end carries a series of splines 34 which, when the sleeve is in its extreme position toward the right, engage internal grooves 35 formed in the hub of the pawl carrier. 36 is a spur gear rigidly secured on the hub of the pawl carrier; and 37 and 38 are similar gears, but successively larger in size, which are rotatably mounted upon the sleeve 23, being interposed between the gear 36 and the bearing support of the brace 9. With these three spur gears thus mounted, the sleeve 23 can be moved axially so as to bring its splines 34 in engagement either with the hub of the pawl carrier or with the gear 37 or the gear 38, these two gears being formed with internal grooves 37$^a$ and 38$^a$ to receive said splines.

39 is a stud shaft carried by the frame brace 9, and on this shaft 39 is rotatably mounted a spur gear 40 which meshes with the gear 38. The gear 40 carries a laterally extending hub flange 41, and on this hub flange are rigidly secured spur gears 42 and 43, the flange 41 being formed with ribs 41$^a$ which engage internal grooves in the gears 42 and 43. The three gears 40, 42 and 43 are thus rigidly connected and must turn in unison.

As has been stated, the sleeve 23 is movable axially so as to bring its splines 34 into engagement with either the pawl carrier of the clutch, which secures it to gear 36, or with the gear 37, or with the gear 38. When one of these three gears is thus connected to the sleeve, its rotation causes the rotation of the sleeve and, therefore, of the seeder shaft. Suppose that the sleeve is thrown into its extreme position to the right; the pawl carrier and gear 36 are then keyed to the sleeve so that when the pawl carrier is turned by the clutch drum, the gear 36, the sleeve 23 and the seeder shaft 13 are turned in unison with it, the gears 40, 42 and 43 being turned meanwhile by the gear 36, and the gears 37 and 38 also being turned by the gears 42 and 40, respectively. The gears 37 and 38 turn freely on the sleeve 23 because its splines 34 are not in engagement with either of said gears. In a word, when the sleeve 23 is in the position referred to, it constitutes a direct driving connection between the pawl carrier and the seeder shaft, while the gears run idly. Again, suppose that the sleeve 23 is moved one step to the left so as to bring the splines 34 into engagement with the gear 37. The rotation of the pawl carrier is now transmitted through the gear 36 to the gear 43. The gear 43 is rigidly connected to the gear 42 and the latter, being in mesh with the gear 37, rotates it and with it the sleeve 23 and seeder shaft 13. The gears 40 and 38 are simultaneously moved, but turn idly, inasmuch as the gear 38 is not connected to the sleeve 23. The movement given to the seeder shaft with the sleeve in this second position is less than that given to it with the sleeve in its first position because of the gear ratios. Preferably the gears 36, 43 and 42, 37 are so proportioned that the full rotation of the pawl carrier gives the seeder shaft only three-quarters of a revolution. Finally, when the sleeve 23 is moved to its extreme position toward the left, the gear 38 is keyed through the sleeve to the seeder shaft and the rotation of the pawl carrier is transmitted through the gears 36, 43 and 40, 38 to the seeder shaft. The ratios of gears 40 and 38 are preferably such that with the sleeve in this third position, the seeder shaft is given one-half a revolution during the full revolution of the pawl carrier.

As has been stated, the seeder shaft carries at each end a bevel pinion 14. Each of these pinions meshes with an annular bevel gear 44 which is connected to a seed plate or ring 45 so that the latter turns with the gear. The seed plate is provided with a series of cells 46, each of which is adapted to receive a single seed, separate it from the supposed mass of seeds in the hopper and deliver it to the dropping mechanism. The seed plate mechanism may be of any preferred form so long as it is of the individual cell type, and the dropping mechanism may be of any form suitable to cooperate with the seed plate mechanism. The dropping mechanism may, for example, be of the common form in which there are an upper valve and a lower valve which control the duct or passage through the seed boot, both valves being actuated by means of suitable connections with the rock shaft 15. Valves of this character are well known and it will suffice to say that the seeds for a hill are first delivered by the seed plate upon the upper valve, then when the check fork is actuated the seeds are dropped from the upper to the lower valve, which, upon the next actuation of the check fork, deposits them in the soil.

I prefer to so space the seed cells and to so proportion the gearing between the seeder shaft and the seed plate that a single full revolution of the seeder shaft will cause four seed cells to pass over the opening through which the seeds are discharged to the dropping mechanism. It will be seen, therefore, that when the sliding sleeve 23 is in its extreme position toward the right, the actuation of the clutch mechanism, when the check fork is engaged by a tappet of the check wire, causes a complete rotation of the seeder shaft and the delivery of four seeds to the dropping mechanism. Similarly, when the sliding sleeve 23 is in its intermediate position, the seeder shaft is given three-quarters of a revolution when the clutch is actuated, and three seeds are delivered to the dropping mechanism. And, finally, when the sleeve 23 is in its extreme position to the left, the seeder shaft is given a half revolution when the clutch is actuated and only two seeds are delivered to the dropping mechanism. In other words, I thus provide for the dropping of either four, three, or two seeds in a hill.

In order that the sleeve 23 may be readily shifted from one position to another by the driver, I provide a foot lever 51, which is pivoted on a pin 52 carried by a bracket 53 mounted on the frame bar 7. The front end of the lever 51 is forked to engage the grooved collar 23ª of the sleeve 23. To the rear of the pivot pin 52 the foot lever is provided with a downwardly extending tooth 51ª adapted to engage the notched extension 53ª of the bracket 53, said extension being preferably provided with three notches, as is clearly indicated in Fig. 7. Beneath this notch are displayed the numerals 2, 3, 4, reading from left to right, said numerals indicating the number of seeds that will be dropped in a hill when the lever is set in the corresponding notches. To make the foot-lever self-locking, the pivot pin 52 is preferably elongated to receive a coiled spring 54, which normally maintains the lever in contact with the supporting bracket 53 and at the same time permits the rear end to be raised somewhat when it is desired to shift the lever. By beveling the sides of the tooth 51ª, it operates as a cam to lift the lever when the driver applies lateral foot pressure to it.

What I claim is—

The combination with a planter frame, axle and ground wheels, of two oppositely positioned seeder mechanisms each having a rotatable seed plate with a series of spaced cells, each adapted to separate a single seed from the seed mass and deliver it to dropping mechanism, a transverse rotatable seeder shaft operably connected with the seed plates, an automatically disengaging check wire actuated clutch having an axle connected driving element and a driven element both rotatable on the seeder shaft, a series of differently diametered gear wheels mounted on the seeder shaft and rotatable independently thereof and of each other, one of them being connected with the driven element of the clutch, a second series of rigidly connected differently diametered gears rotatable about a transverse axis and constantly meshing respectively with the gears of the first said series, and means controllable by the planter operator for connecting any one of the gears of the first said series directly to the seeder shaft in order to drive the seed plates at each clutch actuation through any one of a plurality of definite predetermined angles.

In testimony whereof I affix my signature, in presence of two witnesses.

CHARLES H. WHITE.

Witnesses:
OSCAR F. TUNDAHL,
ROBERT M. ADAMS.